United States Patent
Harding et al.

(10) Patent No.: US 9,079,540 B2
(45) Date of Patent: Jul. 14, 2015

(54) COMBINED STORAGE AND DOCKING UNIT FOR A PORTABLE ELECTRONIC DEVICE

(71) Applicant: Ford Global Technologies, LLC, Dearborn, MI (US)

(72) Inventors: John K. Harding, Leigh-on-Sea (GB); Steve David Fleming, Hockley (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/922,446

(22) Filed: Jun. 20, 2013

(65) Prior Publication Data

US 2014/0153163 A1     Jun. 5, 2014

(30) Foreign Application Priority Data

Jul. 5, 2012    (GB) .................................. 1211988.9

(51) Int. Cl.
     *B60R 7/06*      (2006.01)
     *B60R 11/02*     (2006.01)
     *B60R 11/00*     (2006.01)

(52) U.S. Cl.
CPC . *B60R 7/06* (2013.01); *B60R 11/02* (2013.01); *B60R 11/0258* (2013.01); *B60R 2011/0094* (2013.01)

(58) Field of Classification Search
USPC ........................ 296/37.12, 37.8, 24.3, 24.34
See application file for complete search history.

(56) References Cited

U.S. PATENT DOCUMENTS

| | | | |
|---|---|---|---|
| 4,670,988 A | 6/1987 | Baxter | |
| 5,276,596 A | 1/1994 | Krenzel | |
| 5,779,205 A | 7/1998 | Ching | |
| 5,799,914 A | 9/1998 | Chivallier et al. | |
| 5,842,481 A | 12/1998 | King | |
| 5,988,572 A | 11/1999 | Chivallier et al. | |
| 6,042,414 A | 3/2000 | Kunert | |
| 6,062,518 A | 5/2000 | Etue | |
| 6,398,173 B1 | 6/2002 | Sawayanagi | |
| 6,417,786 B2 | 7/2002 | Learman et al. | |

(Continued)

FOREIGN PATENT DOCUMENTS

| | | |
|---|---|---|
| DE | 102010025563 A1 | 12/2011 |
| EP | 2124129 A2 | 11/2009 |

(Continued)

OTHER PUBLICATIONS

In-Car Mobile Mounting Brackets, Chargers and Ruggedised Technology Cases, ace, Nemesis GB Ltd., 4 pages, dated Jul. 17, 2012.

(Continued)

*Primary Examiner* — Hilary Gutman
(74) *Attorney, Agent, or Firm* — Vichit Chea; Price Heneveld LLP (57) ABSTRACT

A combined storage and docking unit for attachment to the instrument panel of a motor vehicle is disclosed in which a portable electronic device such as an MP3 player or GPS navigation device can be held in a display position by clamping it between lid and storage box parts of the combined storage and docking unit. The storage box includes a trough shaped portion in which the portable electronic device can be stowed if it is not required to be used. The combined storage and docking unit is of a simple construction and allows portable electronic devices of differing size and shape to be accommodated.

20 Claims, 6 Drawing Sheets

(56) References Cited

U.S. PATENT DOCUMENTS

| | | |
|---|---|---|
| 6,524,240 B1 | 2/2003 | Thede |
| 6,539,358 B1 | 3/2003 | Coon et al. |
| 6,558,193 B2 | 5/2003 | Sawayanagi et al. |
| 6,633,482 B2 | 10/2003 | Rode |
| 7,062,300 B1 | 6/2006 | Kim |
| 7,140,586 B2 | 11/2006 | Seil et al. |
| 7,269,002 B1 | 9/2007 | Turner et al. |
| 7,413,155 B2 | 8/2008 | Seil et al. |
| 7,623,958 B1 | 11/2009 | Laverick et al. |
| 7,873,771 B2 | 1/2011 | Krueger et al. |
| 7,911,779 B1 | 3/2011 | Tarnoff |
| 7,930,004 B2 | 4/2011 | Seil et al. |
| 7,930,006 B2 | 4/2011 | Neu et al. |
| 7,931,505 B2 | 4/2011 | Howard et al. |
| 7,933,117 B2 | 4/2011 | Howarth et al. |
| 8,120,895 B2 | 2/2012 | Zeller et al. |
| 8,145,821 B2 | 3/2012 | Mead et al. |
| 8,172,293 B2 | 5/2012 | Lota et al. |
| 8,183,825 B2 | 5/2012 | Sa |
| 8,242,906 B2 | 8/2012 | Fawcett |
| 8,325,028 B2 | 12/2012 | Schofield et al. |
| 8,331,084 B2 | 12/2012 | Chung et al. |
| 8,376,595 B2 | 2/2013 | Higgins-Luthman |
| 8,385,074 B2 | 2/2013 | Karl et al. |
| 8,393,584 B2 | 3/2013 | Burns |
| 8,492,698 B2 | 7/2013 | Schofield et al. |
| 8,496,144 B2 | 7/2013 | Son |
| 8,845,003 B2 | 9/2014 | Still et al. |
| 2004/0023633 A1 | 2/2004 | Gordon |
| 2005/0014536 A1 | 1/2005 | Grady |
| 2005/0045681 A1 | 3/2005 | Hancock et al. |
| 2006/0024107 A1 | 2/2006 | Lyman et al. |
| 2006/0052144 A1 | 3/2006 | Seil et al. |
| 2007/0018064 A1 | 1/2007 | Wang |
| 2007/0114974 A1 | 5/2007 | Grady |
| 2007/0281619 A1 | 12/2007 | Chen |
| 2008/0019082 A1 | 1/2008 | Krieger et al. |
| 2008/0174136 A1 | 7/2008 | Welschholz et al. |
| 2009/0275362 A1 | 11/2009 | Tieman et al. |
| 2010/0078536 A1 | 4/2010 | Galvin |
| 2010/0277862 A1 | 11/2010 | Kim |
| 2011/0121148 A1 | 5/2011 | Pernia |
| 2011/0163211 A1 | 7/2011 | Cicco |
| 2011/0255226 A1 | 10/2011 | Duncan Seil et al. |
| 2011/0259789 A1 | 10/2011 | Fan |
| 2011/0263293 A1 | 10/2011 | Blake et al. |
| 2012/0002355 A1 | 1/2012 | Chen |
| 2012/0018473 A1 | 1/2012 | Da Costa Pito et al. |
| 2012/0043235 A1 | 2/2012 | Klement |
| 2012/0061983 A1 | 3/2012 | Seiller et al. |
| 2012/0222935 A1 | 9/2012 | MacKay et al. |
| 2012/0236479 A1 | 9/2012 | Tamai et al. |
| 2012/0318796 A1 | 12/2012 | Doll |
| 2013/0016463 A1 | 1/2013 | Hiramoto et al. |
| 2013/0043779 A1 | 2/2013 | Fan |
| 2013/0050917 A1 | 2/2013 | Chuang et al. |
| 2013/0188300 A1 | 7/2013 | Schrock et al. |
| 2014/0097320 A1 | 4/2014 | Rizk et al. |

FOREIGN PATENT DOCUMENTS

| | | |
|---|---|---|
| EP | 2431230 A1 | 3/2012 |
| FR | 2921315 A1 | 3/2009 |
| KR | 100895585 | 4/2009 |
| WO | 2009127439 A2 | 10/2009 |
| WO | 2009143969 A1 | 12/2009 |
| WO | 2010018011 A1 | 2/2010 |
| WO | 2011047984 A2 | 4/2011 |
| WO | 2011060963 A1 | 5/2011 |

OTHER PUBLICATIONS

"Galaxy S III charting Dock," iBolt.co, http://ibolt.com, 2 pages, Copyrighted 2012 iBolt Co.

"Top Cellet Vehicle Dash Phone Holder for Cell Phones & Smartphones," Rocky Case, 2 pages, Copyrighted 2013, www.rockycase.com.

COMBINED STORAGE AND DOCKING UNIT FOR A PORTABLE ELECTRONIC DEVICE

FIELD OF THE INVENTION

The invention generally relates to motor vehicles, and more particular to the storage and use of a portable electronic device in a motor vehicle.

BACKGROUND OF THE INVENTION

It is generally known from, for example, WO2011/060963 to provide a combined storage and docking unit for a motor vehicle. The unit generally includes a storage space, a cover flap covering an opening of the storage space and a mechanism for opening and closing the cover flap. A holder is provided to hold a portable electronic device in a display position in which it can be viewed by a user of the motor vehicle.

It is a problem with such a unit that it is typically limited with respect to the size and shape of the portable electronic devices that can be supported by the shape and dimensions of the holder. It is a further problem with such a unit that the holder and the mechanism required to position it add complexity and cost to the unit.

It is desirable to provide a combined storage and docking unit for a motor vehicle that can accommodate a wide range of portable electronic devices.

SUMMARY OF THE INVENTION

According to one aspect of the present invention, a combined storage and docking unit for a portable electronic device is provided. The unit includes a storage box for attachment to an instrument panel of a motor vehicle and a lid hingedly connected to the storage box by a pair of depending arms located near a rear end of the lid. At least one electrical connector is attached to the storage box for selectively connecting the portable electronic device to one or more electrical circuits of the motor vehicle. A lid opening spring is connected to the lid to bias the lid towards an open position and a user operable locking mechanism holds the lid in a desired position against action of the lid opening spring. The user operable locking mechanism is operable to allow free movement of the lid when released and prevent movement of the lid in either direction when engaged and is selectively engageable to hold the cover in a position in which the portable electronic device is clamped between the lid and the storage box in a display position in which the electronic device is visible to a user of the motor vehicle.

According to another aspect of the present invention, a portable electronic device docking unit is provided. The unit includes a storage box for attachment to a vehicle and a lid hingedly connected to the storage box by a pair of depending arms located near a rear end of the lid. The unit also includes an electrical connector, a lid opening spring operatively coupled to the lid, and a user operable locking mechanism to hold the lid in a desired position against the action of the lid opening spring.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

According to one embodiment, a combined storage and docking unit for a portable electronic device having a storage box for attachment to an instrument panel of a motor vehicle is disclosed. The unit includes a lid hingedly connected to the storage box by a pair of depending arms located near to a rear end of the lid, at least one electrical connector attached to the storage box for selectively connecting the portable electronic device to one or more electrical circuits of the motor vehicle, a lid opening spring connected to the lid to bias the lid towards an open position and a user operable locking mechanism to hold the lid in a desired position against the action of the lid opening spring wherein the user operable locking mechanism is operable to allow free movement of the lid when released and prevent movement of the lid in either direction when engaged and is selectively engageable to hold the cover in a position in which the portable electronic device is clamped between the lid and the storage box in a display position in which it is visible to a user of the motor vehicle.

One advantage of the unit is that it permits portable electronic devices of differing size to be accommodated by a simple adjustment of lid opening position. A further advantage is that such portable electronic device can be held in a display position in either a landscape orientation or a portrait orientation without the need for other components.

The storage box may have a trough shaped portion in which the portable electronic device is stowable and the at least one electrical connector may be located within the trough shaped portion of the storage box.

The storage box may have a trough shaped portion in which the portable electronic device is stowable and, when the portable electronic device is in a stowed position within the trough shaped portion of the storage box, the user operable locking mechanism may be engageable to hold the lid in a closed position so as to obscure the portable electronic device from view.

The lid may have a first jaw portion located near to a front end of the lid for cooperation with a second jaw portion of the storage box located near to a front end of the storage box and the two jaw portions may form in combination a clamping for holding the portable electronic device in the display position. Preferably, at least one of the jaw portions may have a compressible non-slip pad attached thereto to aid with gripping of the portable electronic device between the lid and the storage box.

At least one of the depending arms may form part of the user operable locking mechanism. At least one of the depending arms may be used to connect the lid to the lid opening spring.

The user operable locking mechanism may include a user input device and, when the user input device is operated by a user of the motor vehicle, the locking mechanism may be released to permit free movement of the lid and, when the user input device is not operated by a user of the motor vehicle, the user operable locking mechanism may be engaged to prevent movement of the lid in either direction.

With particular reference to FIGS. 1 to 7 there is shown part of a passenger compartment of a motor vehicle having an instrument panel 10 which includes an instrument binnacle or cluster 11. A combined storage and docking unit 20 is fitted by attachment to the instrument panel 10 in a generally central position of the instrument panel 10 so as to be within easy reach of a driver of the motor vehicle. The instrument panel 10 has an aperture (not shown) into which the storage box 21 is fitted and attached by any convenient attachment means such as snap lock fastenings, screws, bolts or adhesive pads. It will be appreciated that the term "instrument panel" is to be interpreted broadly so as to include not only a horizontally extending dashboard including an instrument binnacle or cluster of a motor vehicle but also a vertically extending center console that may depend from a dashboard of the vehicle.

Figure 1:
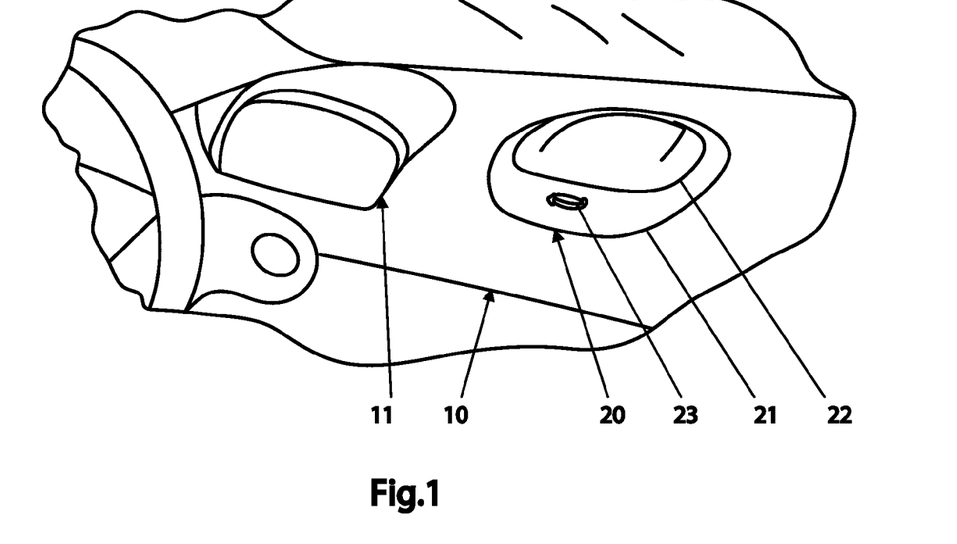
FIG. 1 is a pictorial view of part of a passenger compartment of a motor vehicle showing an instrument panel to which is fitted a combined storage and docking unit for a portable electronic device according to a first embodiment showing the unit in a closed state.

In FIG. 1 the combined storage and docking unit 20 is shown in a closed state in which a lid member 22 is in a closed position so as to obscure from view an interior portion of a storage box member 21 of the combined storage and docking unit 20. When the combined storage and docking unit 20 is in this closed state, a portable electronic device 5 can be stowed within a trough shaped portion 25 of the storage box 21 and will not be visible to either a user of the motor vehicle or any other person able to see into the passenger compartment of the motor vehicle.

Figure 2:
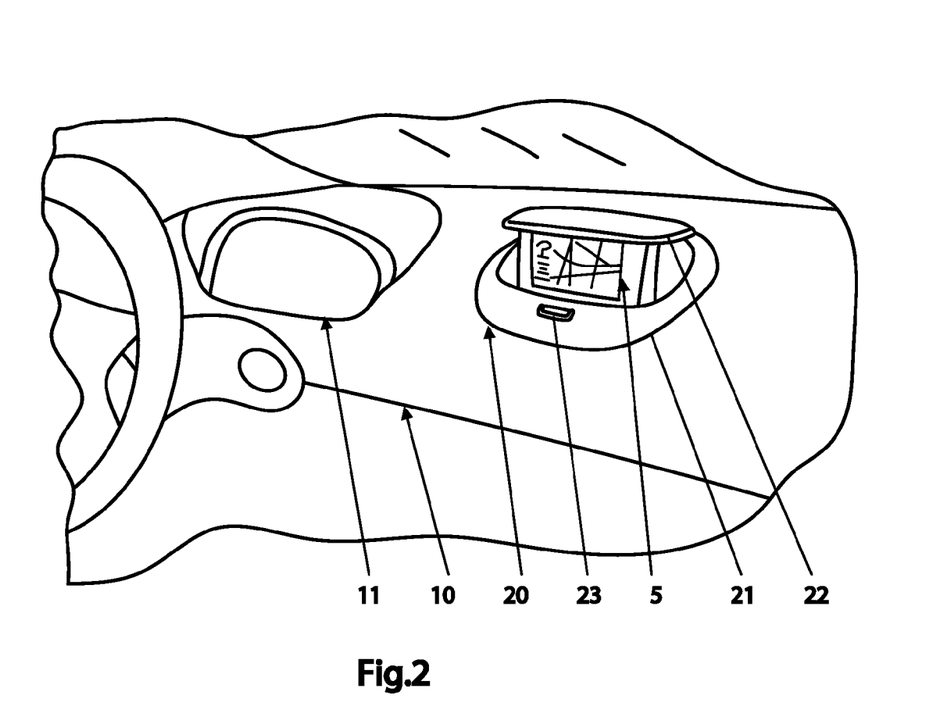
FIG. 2 is a pictorial view similar to FIG. 1 but showing the unit in an open state with the portable electronic device in a display position in which it is visible to a user of the motor vehicle.

In FIG. 2 the combined storage and docking unit 20 is shown in an open state, and in this state the portable electronic device 5 can be positioned in a display position in which it is visible to a user of the motor vehicle. In the display position the portable electronic device 5 can be used by a user of the motor vehicle to, for example, view navigational data such as a map and guidance information or to play music or video files.

A user input device, such as a pushbutton 23 is provided to permit the lid 22 to be opened and closed and to enable it to be locked in a position in which the portable electronic device 5 is clamped directly between the lid 22 and the storage box 21 as described in greater detail hereinafter.

Figure 3:
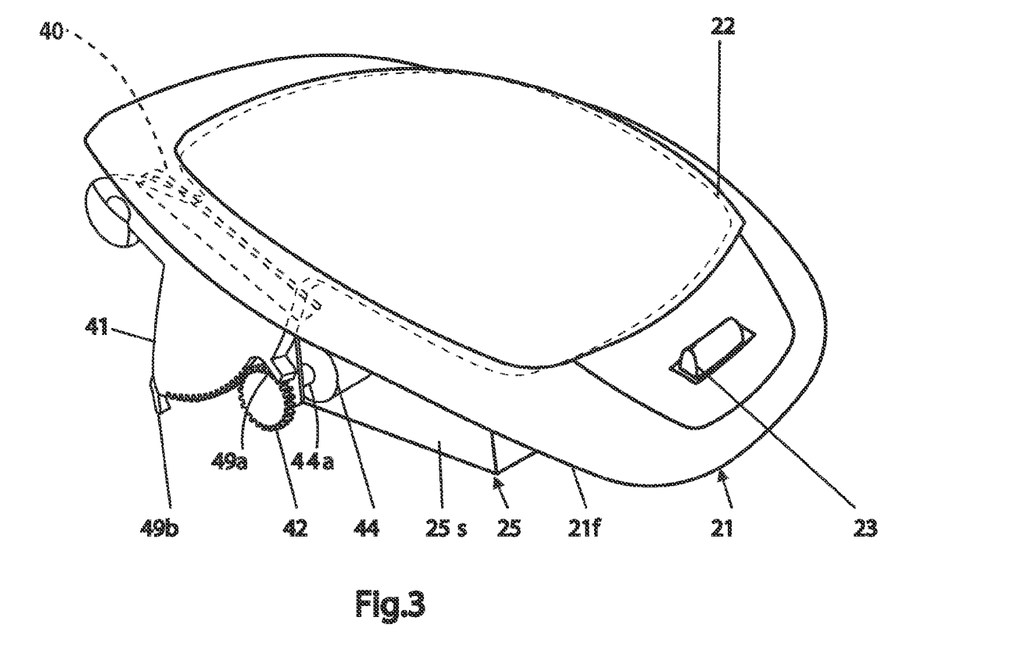
FIG. 3 is an enlarged pictorial view of the unit shown in FIG. 1 as it appears when removed from the instrument panel.

The storage box 21 comprises the trough shaped portion 25 which is defined by a first end wall 25a, a second end wall 25c, a floor 25b, two side walls 25s, a jaw portion 26 located near to a front end of the storage box 21 and a flange portion 27 which forms a rim around the storage box 21. The button 23 projects through an aperture formed in the flange portion 27.

Figure 4:
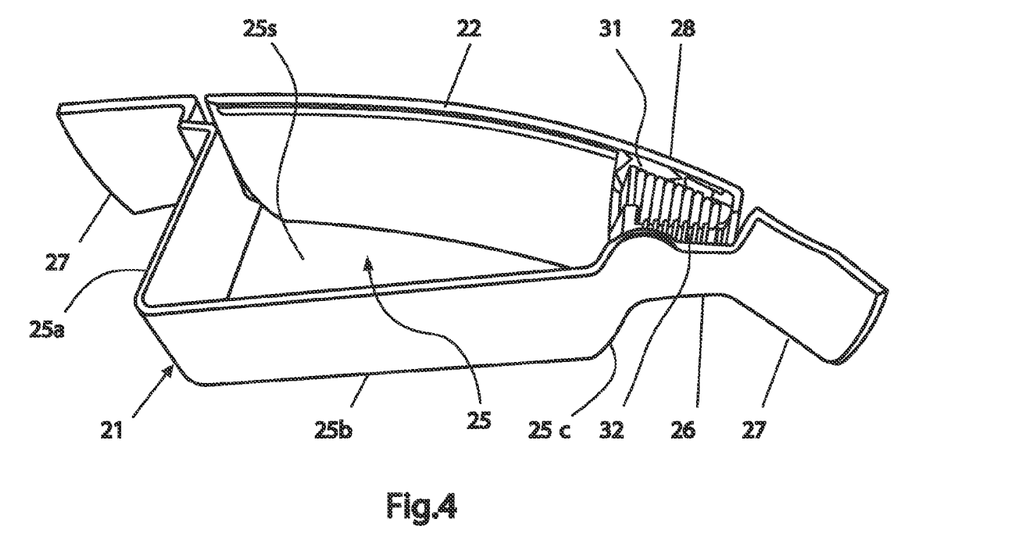
FIG. 4 is a cut-away pictorial side view of the unit shown in FIG. 3.

The lid 22 has two depending arms 41 located near a rear end of the lid 22 by which the lid 22 is pivotally connected to the storage box 21 via a cross shaft 50. The cross shaft 50 is rotatably supported by two flanges 55 extending out from the first end wall 25a of the trough shaped portion 25 of the storage box 25. Each of the arms 41 is fixed fast to the cross shaft 50 so that they both rotate with the cross shaft 50 to produce an opening and closing motion of the lid 22. It will be appreciated that apertures 40 are formed in the storage box 21 between the flange 27 and a rim of the trough shaped portion 25 to permit the passage of the two depending arms 41.

The lid 22 has a first jaw portion 28 located near to a front end of the lid 22 for cooperation with the second jaw portion 26 of the storage box 21 to provide a clamp or clamping means for the portable electronic device 5. At least one and in this case both of the jaw portions 26, 28 has a respective non-slip pad fastened thereto in the form of compressible plastic foam pads 32, 31. It is advantageous to use compressible pads rather than non-slip coatings because compressible pads provide a more progressive increase in clamping load when the portable electronic device 5 is being clamped and thereby provide a better retaining function.

The lid 22 is biased into an open position by a lid opening spring in the form of a helical torsion spring 60. The torsion spring 60 has a first tail engaged with an aperture 60a in the cross shaft 50 and a second tail engaged with an aperture 60b in the first end wall 25a. The helical spring 60 acts so as to urge the cross shaft 50 in an anti-clockwise direction as viewed in FIGS. 5 and 6 thereby causing the lid 22 to be raised towards its open position.

Figure 5:
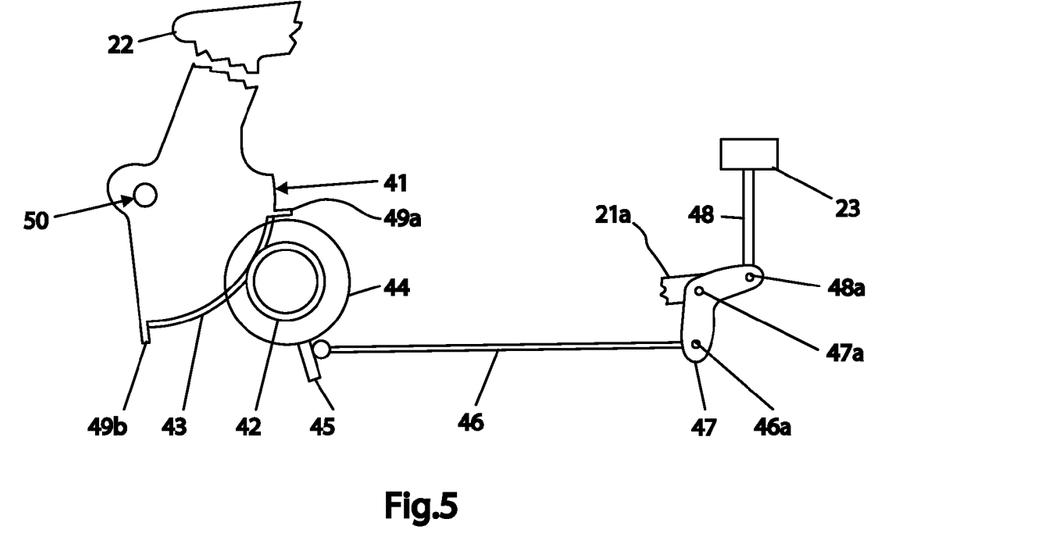
FIG. 5 is a schematic representation of a first embodiment of a lid locking mechanism for the unit shown in FIGS. 1 to 4.
Figure 6:
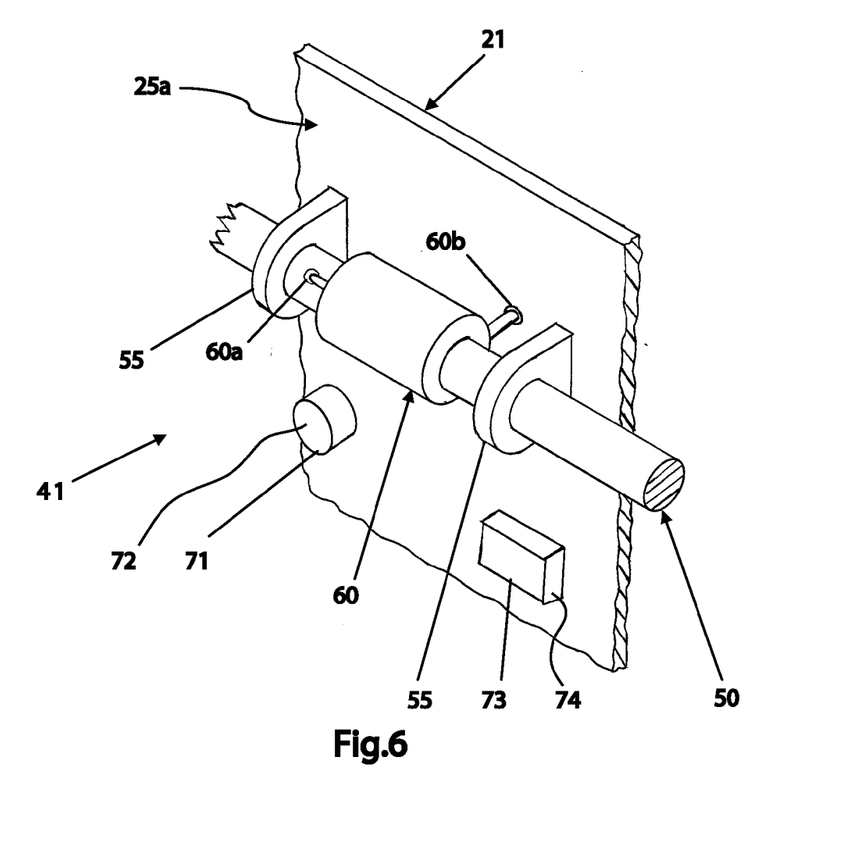
FIG. 6 is a schematic representation of a first embodiment of a lid lifting mechanism for the unit shown in FIGS. 1 to 4.

A user operable locking mechanism is provided to selectively hold the lid 22 in various positions between a closed position, in which the lid 22 lies flat against the storage box 21 or to be more precise flat against an upper rim of the storage portion 25, and a fully open position, in which the lid 22 is raised to its full extent. The lid locking mechanism therefore prevents movement of the lid 22 against the action of the torsion spring 60 and, when in a locked state, prevents movement of the lid 22 in any direction, that is either the opening direction or closing direction. Two end stops 49a, 49b are provided on each of the depending arms 41 to limit the range of movement of the lid 22.

Figure 7:
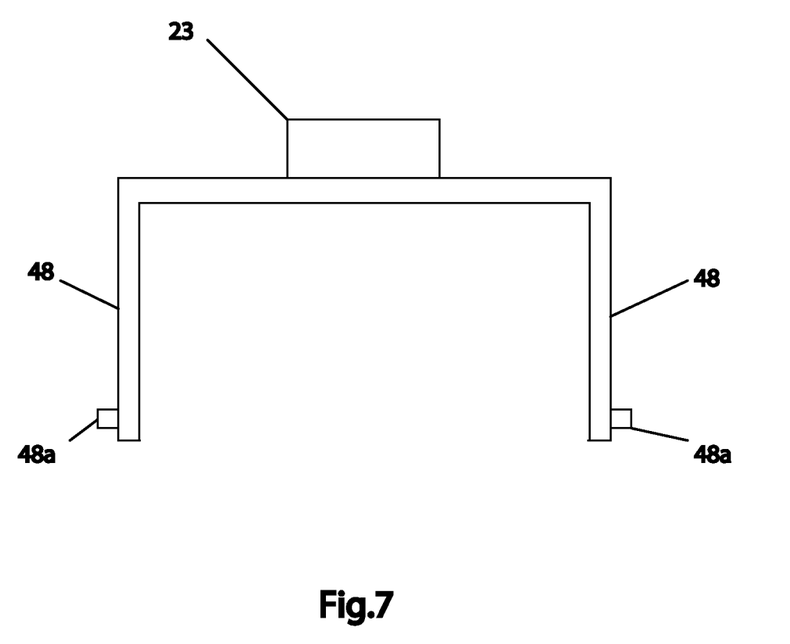
FIG. 7 is an enlarged end view of a user input device for the locking mechanism shown in FIG. 5.

The user locking mechanism includes a pair of brake units 44 each having an output shaft 44a connected to a respective spur gear 42 engaged with a curved rack 43 formed as part of a respective one of the two depending arms 41. Each brake unit 44 has an input arm 45 connected to the button 23 via a linkage having a first link rod 46, a bell crank 47 and a second link rod 48. Each of the first link rods 46 is pivotally connected at one end to the bell crank 47 via a pivot pin 46a and abuts at an opposite end the input arm 45 of the brake unit 44 that it controls. Each of the second link rods 48 is connected at an upper end to a cross beam formed as part of the button 23 and is pivotally connected at a lower end by a pivot pin 48a to the bell crank 47. The bell crank 47 is pivotally connected to the storage box 21 via a pivot pin 47a and flange 21a.

Each brake unit 44 includes a helical spring that is wound around and, in a relaxed state is an interference fit on, the shaft 44a to which the respective spur gear 42 is fastened. The helical spring is anchored at one end to a casing of the brake unit 44. When the input arm 45 is acted against by the first link rod 46 the helical spring is partially unwound thereby releasing its grip on the shaft 44a so as to allow the spur gear 42 to rotate freely. When no load is applied to the input arm 45 the helical spring grips the shaft 44a firmly and the shaft 44a and associated spur gear 42 are unable to rotate in either direction thereby locking the lid 22 in position. Such brake units are similar in construction to On-Off spring clutches such as those sold by Helander Products Inc. under the trade name Tiny-Clutch®. Such brake units have the advantage that the lid 22 can be locked in any position between fully open and fully closed positions thereby allowing portable electronic devices 5 of varying size to be easily accommodated. It should be appreciated that other types of brake units could be used such as friction brakes that would also provide infinite adjustment of opening width.

If a user depresses the button 23 the two brake units 44 will be released and the lid 22 will open under the action of the torsion spring 60 to its fully open position as governed by the end stops 49b on the two depending arms 41. A user can then retrieve a portable electronic device 5 from the trough shaped portion 25 of the storage box 21 if one is located there or place a portable electronic device 5 in the trough shaped portion 25 if so desired.

In the fully open position, a portable electronic device 5 can be positioned between the jaw portions 26, 28 in a display position. The user can then by depressing the button 23 and applying a downward pressure to the lid 22 move it towards the closed position until the portable electronic device 5 is gripped or clamped between the two anti-slip pads 32, 31 with sufficient force to hold it in position. The compressibility of the pads 32, 31 assists with this as they provide a progressive increase in clamping load thereby providing feedback to a user.

If the user then releases the button 23, the two brake units 44 will engage to lock the lid 22 in position thereby holding the portable electronic device 5 in its display position ready for use by a user of the motor vehicle.

To remove the portable electronic device 5 from the combined storage and docking unit 20, the button 23 is depressed by a user of the motor vehicle using one hand while holding the portable electronic device 5 with the other hand. This will release the brake units 44 and the torsion spring 60 will then cause the lid 22 to open until it reaches its fully open position as governed by the end stops 49b. The user can then stow the portable electronic device 5 in the trough shaped portion 25 or remove it from the combined storage and docking unit 20.

The lid 22 can then be closed by the user applying a downward pressure to it while simultaneously depressing the button 23 until the lid 22 is fully closed as controlled by the end stops 49a. If the user then releases the button 23 the lid 22 is held closed by the two brake units 44.

It should be appreciated that the locking mechanism could be applied to only one side of the lid 22 but it is preferable to have both sides of the lid braked or locked to prevent distortion of the lid 22 and to improve the clamping of the portable electronic device 5. It should also be appreciated that in practice a damping mechanism may also be included to prevent rapid and uncontrolled opening of the lid 22.

To enable the portable electronic device 5 to be connected to one or more electrical circuits of the motor vehicle, two electrical connectors or connection means in the form of sockets 71, 73 are attached to the first end wall 25a so as to be located within the trough shaped portion 25. Each of the sockets 71, 73 is therefore accessible from the trough shaped portion 25 of the storage box 21 and in this case include an electrical supply socket 71 connected via a cable 72 to a power supply circuit of the motor vehicle and a data transfer socket 73 connected via a cable 74 to an audio system of the motor vehicle. The electrical supply socket 71 enables the portable electronic device 5 to be recharged or powered via the electrical circuit of the motor vehicle.

The data transfer socket 73 enables in this case music stored on the portable electronic device 5 to be played via the audio system of the motor vehicle. It will however be appreciated that the data transferred could be of a different nature such as, for example, video data or data for use in navigating the vehicle. For example, the portable electronic device 5 could be a GPS enabled device and the data transferred could be a map and directions to enable the user to navigate to a selected destination that are displayable on a display screen forming part of the motor vehicle when the portable electronic device 5 is connected to the motor vehicle via the data transfer socket 73.

Figure 8:
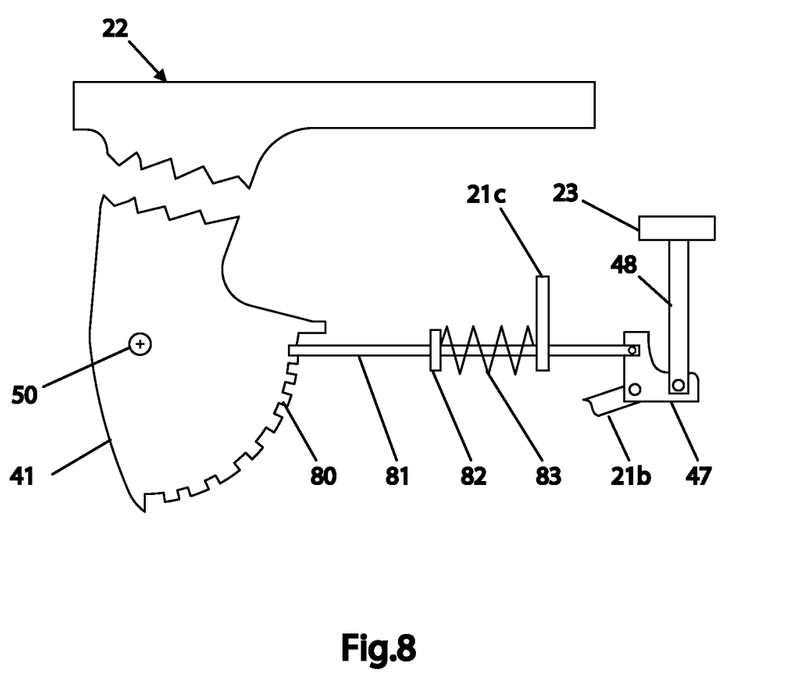
FIG. 8 is a schematic representation of a second embodiment of a lid locking mechanism for the unit shown in FIGS. 1 to 4.

Referring now to FIG. 8 there is shown a second embodiment of a lid locking mechanism that could be used to replace that previously described. In this embodiment, as before the lid 22 has a pair of depending arms 41 each of which is fastened to a cross shaft 50, but in this case, instead of the use of brake units 44, a simple rack and pin locking mechanism is used. Each of the depending arms 41 has a number of square teeth 80 formed around part of its periphery. A respective locking rod 81 is biased towards each depending arm 41 so as to be engageable with one of a number of recesses defined between the teeth 80. When the locking rod 81 is engaged with one of the recesses, the respective depending arm 41 and hence the lid 22 is prevented from movement in any direction and, when the locking rod 81 is not engaged with one of the recesses, the lid 22 and its depending arms 41 are free to rotate in either direction.

Each locking rod 81 is biased by a helical compression spring 83 towards the respective depending arm 41 and is guided by a pair of spaced apart guides (not shown). The spring 83 acts at one end against a flange 82 fixed to the locking rod 81 and at an opposite end against a flange 21c formed as part of the storage box 21. As before, the button 23 operates a link rod 48 connected to a bell crank 47 that is pivotally connected to the storage box 21 via a bracket 21b and is also pivotally connected to one end of the locking rod 81. The bell crank 47 is arranged to pull the locking rod 81 away from the depending arm 41 when the button 23 is depressed so as to allow the lid 22 to move freely. When the button 23 is released the spring 83 urges the locking rod 81 into engagement with one of the recesses so as to lock the lid 22 in position.

Therefore, if a user presses the button 23, the two locking rods 81 will be retracted and the lid 22 will open to its fully open position due to the action of a spring operated opening mechanism (not shown on FIG. 8). A user can then retrieve a portable electronic device 5 from the trough shaped portion 25 of the storage box 21 if one is located there or place a portable electronic device 5 in the trough shaped portion 25 if so desired.

As before, so long as the user maintains the button 23 depressed the lid 22 can then be freely moved by a user into a desired position. If a portable electronic device 5 is positioned between the jaw portions 26, 28 in a display position, the user can then, by depressing the button 23 and by applying downward pressure to the lid 22, move the lid 22 towards the closed position until the portable electronic device 5 is gripped or clamped between the two anti-slip pads 32, 31 with sufficient force to hold it in position. The user can then release the button 23 and the two locking rods 81 will engage with the recesses in the depending arms 41 to lock the lid 22 in position thereby holding the portable electronic device 5 in its display position ready for use by a user of the motor vehicle.

To remove the portable electronic device 5 from the combined storage and docking unit 20, the button 23 is depressed by a user of the motor vehicle using one hand while holding the portable electronic device 5 with the other hand. The will release the locking rods 81 from the recesses and the lid 22 will open. The user can then stow the portable electronic device 5 in the trough shaped portion 25 or remove it from the combined storage and docking unit 20. The lid 22 can then be closed by the user applying a downward pressure to it while simultaneously depressing the button 23 until it is fully closed. If the user then releases the button 23, the lid 22 will then be held closed by the locking mechanism.

It should be appreciated that the locking mechanism could be applied to only one side of the lid 22 but it is preferable to have both sides of the lid 22 locked to prevent distortion of the lid 22 and improve the clamping of the portable electronic device 5. It should also be appreciated that the use of thick compressible anti-slip pads are particularly advantageous with such a locking mechanism because the gaps between the locking positions can be compensated for by the compressibility of the anti-slip pads.

Figure 9:
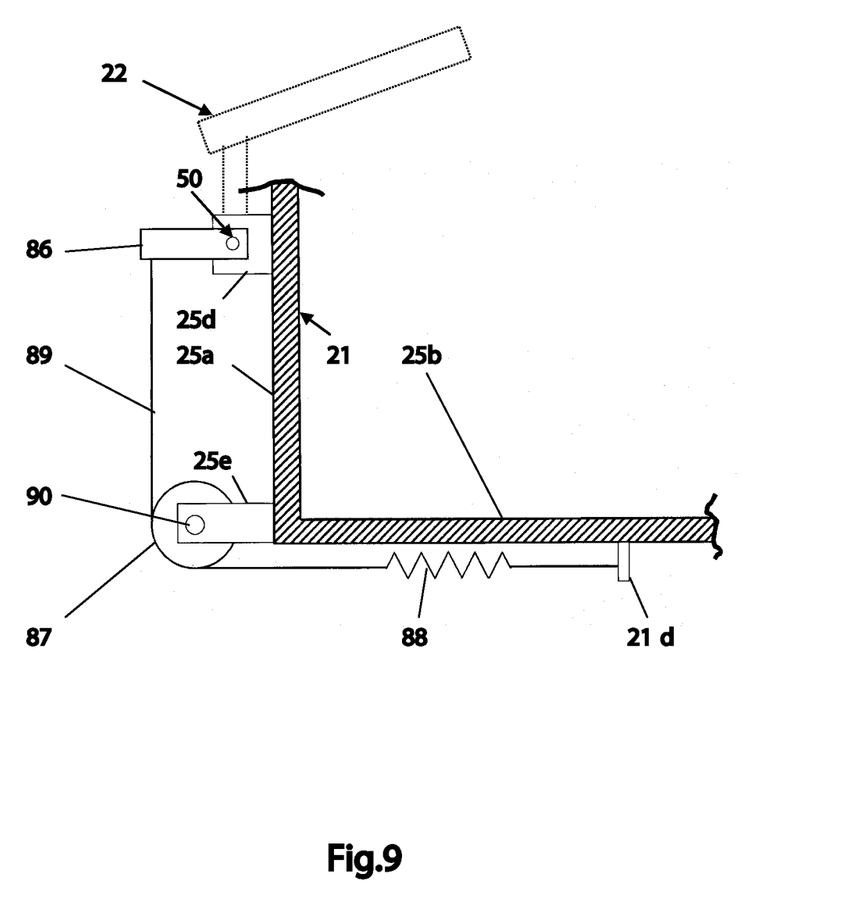
FIG. 9 is a schematic representation of a second embodiment of a lid lifting mechanism for the unit shown in FIGS. 1 to 4.

Referring now to FIG. 9 there is shown a second embodiment of a mechanism for opening the lid 22. The primary difference between this embodiment and the first embodiment previously described is that instead of using a torsion spring 60 a helical tension spring 88 is used.

In this embodiment, the lid opening mechanism includes an arm 86 fixed to the cross shaft 50, a drive cable 89 connected at one end to the arm 86 and at an opposite end to the extension spring 88 and a pulley 87 to guide the drive cable 89 from the arm 86 to the spring 88. The cross shaft 50 is rotatably supported by, in this case, a pair of spaced apart brackets 25d extending from the first end wall 25a of the storage box 21. The pulley 87 is rotatably supported by a pivot pin 90 engaged with a bracket 25e extending from the first end wall 25a.

The spring 88 has one end fastened to the floor 25b of the trough shaped portion 25 of the storage box 21 via a bracket 21d and has the other end connected to the drive cable 89. Irrespective of whether the lid 22 is in a fully closed position or a fully open position the spring 88 remains in tension, but when the lid 22 is fully closed the force in the spring 88 is greater than when the lid 22 is fully open.

The action of the spring 88 is to bias the lid 22 into an open position by pulling on the drive cable 89. The pulling action on the drive cable 87 will cause the cross shaft 50 to rotate in a counter clockwise direction as viewed in FIG. 9, thereby causing the lid 22 which is fastened to the cross shaft 50 to be lifted as indicated by the dotted lines in FIG. 9. It will be appreciated that, as before, a locking or braking mechanism will be used to hold the lid 22 in a desired position against the action of the spring 88.

Therefore, in summary, a combined storage and docking unit for a portable electronic device is provided that is of simple construction requiring no complex additional components to hold the portable electronic device and can accommodate portable electronic devices of differing shape and size.

Although the invention has been described by way of example with reference to two mechanisms for opening the lid and two mechanisms for locking the lid in position it will be appreciated that it is not limited to such examples. For example other forms of locking mechanism could be used to hold the lid in position, the primary requirement for such a locking mechanism being that the lid is prevented from movement in either direction when the locking mechanism is engaged and is permitted to move freely when the locking mechanism is released by a user of the motor vehicle.

It should also be appreciated that the user input device need not be a push button but could be a slide operated device or a rotary operated device.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A combined storage and docking unit for a portable electronic device comprising:
    a storage box for attachment to an instrument panel of a motor vehicle, the storage box having a pair of apertures;
    a lid hingedly connected to the storage box by a pair of depending arms fixedly attached to the lid, wherein the pair of arms extend through the apertures and below the floor of the storage box;
    an electrical connector attached to the storage box for selectively connecting the portable electronic device to one or more electrical circuits of the motor vehicle;
    a lid opening spring connected to the lid to bias the lid towards an open position; and
    a user operable locking mechanism to hold the lid in a desired position against action of the lid opening spring, wherein the user operable locking mechanism is operable to allow free movement of the lid when released and prevent movement of the lid in either direction when engaged and is selectively engageable to hold the lid in a position in which the portable electronic device is clamped between the lid and the storage box in a display position in which the electronic device is visible to a user of the motor vehicle.

2. The unit as claimed in claim 1, wherein the storage box has a trough shaped portion in which the portable electronic device is stowable, and wherein the at least one electrical connector is located within the trough shaped portion of the storage box.

3. The unit as claimed in claim 1, wherein the storage box has a trough shaped portion in which the portable electronic device is stowable and, when the portable electronic device is in a stowed position within the trough shaped portion of the storage box, the user operable locking mechanism is engageable to hold the lid in a closed position so as to obscure the portable electronic device from view.

4. The unit as claimed in claim 1, wherein the lid has a first jaw portion located near a front end of the lid for cooperation with a second jaw portion of the storage box located near a front end of the storage box, and wherein the first and second jaw portions form in combination a clamp for holding the portable electronic device in the display position.

5. The unit as claimed in claim 4, wherein at least one of the first and second jaw portions has a compressible non-slip pad attached thereto to aid with gripping of the portable electronic device between the lid and the storage box.

6. The unit as claimed in claim 1, wherein at least one of the depending arms forms part of the user operable locking mechanism.

7. The unit as claimed in claim 1, wherein at least one of the depending arms is used to connect the lid to the lid opening spring.

8. The unit as claimed in claim 1, wherein the user operable locking mechanism includes a user input device wherein, when the user input device is operated by a user of the motor vehicle, the locking mechanism is released to permit free movement of the lid and, when the user input device is not operated by a user of the motor vehicle, the user operable locking mechanism is engaged to prevent movement of the lid in either direction.

9. A portable electronic device docking unit comprising:
a storage box for attachment to a vehicle;
a lid hingedly connected to the storage box;
a torsion spring operative to bias the lid to an open position and coupled to a cross shaft disposed beneath the storage box; and
a user operable locking mechanism including a brake unit to hold the lid in a desired position against action of the spring and to selectively clamp a portable electronic device between the lid and the storage box.

10. The unit as claimed in claim 9, wherein the user operable locking mechanism is operable to allow free movement of the lid when released and prevent movement of the lid in either direction when engaged and is selectively engageable to hold the cover in a position in which the portable electronic device is clamped between the lid and the storage box in a display position in which it is visible to a user of the motor vehicle.

11. The unit as claimed in claim 9, wherein the spring biases the lid towards an open position.

12. The unit as claimed in claim 9 further comprising an electrical connector adapted to connect to the portable electronic device.

13. The unit as claimed in claim 12, wherein the electrical connector is attached to the storage box for selectively connecting the portable electronic device to one or more electrical circuits of the vehicle.

14. The unit as claimed in claim 9, wherein the storage box has a trough shaped portion in which the portable electronic device is stowable, and wherein the at least one electrical connector is located within the trough shaped portion of the storage box.

15. The unit as claimed in claim 9, wherein the storage box has a trough shaped portion in which the portable electronic device is stowable and, when the portable electronic device is in a stowed position within the trough shaped portion of the storage box, the user operable locking mechanism is engageable to hold the lid in a closed position so as to obscure the portable electronic device from view.

16. The unit as claimed in claim 9, wherein the lid has a first jaw portion located near a front end of the lid for cooperation with a second jaw portion of the storage box located near a front end of the storage box, and wherein the first and second jaw portions form in combination a clamp for holding the portable electronic device in the display position.

17. The unit as claimed in claim 16, wherein at least one of the first and second jaw portions has a compressible non-slip pad attached thereto to aid with gripping of the portable electronic device between the lid and the storage box.

18. The unit as claimed in claim 9 further comprising a pair of arms located near a rear end of the lid for hingedly connecting the lid to the storage box.

19. A portable electronic device docking unit comprising:
a storage box for attachment to a vehicle;
a lid hingedly connected to the storage box;
a spring operative to bias the lid to an open position; and
a brake unit having an input arm connected to a button via a linkage having first and second link rods and a bell crank.

20. The unit as claimed in claim 19, wherein the first link rod is pivotally connected at one end to the bell crank via a pivot pin and abuts at an opposite end the input arm and the second link rod is connected at an upper end to a cross beam formed as part of the button and is pivotally connected at a lower end by a pivot pin to the bell crank.

\* \* \* \* \*